United States Patent
Zhang et al.

(10) Patent No.: US 8,225,488 B1
(45) Date of Patent: Jul. 24, 2012

(54) METHOD FOR PROVIDING A PERPENDICULAR MAGNETIC RECORDING (PMR) POLE

(75) Inventors: Jinqiu Zhang, Fremont, CA (US); Yun-Fei Li, Fremont, CA (US); Ying Hong, Morgan Hill, CA (US)

(73) Assignee: Western Digital (Fremont), LLC, Fremont, CA (US)

(*) Notice: Subject to any disclaimer, the term of this patent is extended or adjusted under 35 U.S.C. 154(b) by 405 days.

(21) Appl. No.: 12/471,278

(22) Filed: May 22, 2009

(51) Int. Cl.
  *G11B 5/127* (2006.01)
  *H04R 31/00* (2006.01)

(52) U.S. Cl. .............. 29/603.16; 29/603.11; 29/603.13; 29/603.14; 29/603.15; 29/603.18; 216/62; 216/65; 216/66; 360/121; 360/122; 360/317; 451/5; 451/41

(58) Field of Classification Search .............. 29/603.11, 29/603.13–603.16, 603.18; 216/62, 66, 67; 360/121, 122, 317
See application file for complete search history.

(56) References Cited

U.S. PATENT DOCUMENTS

| | | | |
|---|---|---|---|
| 4,671,849 A | 6/1987 | Chen et al. | |
| 5,075,956 A * | 12/1991 | Das ........................ | 29/603.14 |
| 5,664,316 A | 9/1997 | Chen et al. | |
| 6,172,848 B1 | 1/2001 | Santini | |
| 6,261,967 B1 | 7/2001 | Athavale et al. | |
| 6,369,984 B1 | 4/2002 | Sato | |
| 6,564,445 B1 | 5/2003 | Hashimoto et al. | |
| 6,722,018 B2 | 4/2004 | Santini | |
| 6,731,460 B2 | 5/2004 | Sasaki | |
| 6,762,911 B2 | 7/2004 | Sasaki et al. | |
| 6,783,874 B2 | 8/2004 | Hasegawa et al. | |
| 6,813,116 B2 | 11/2004 | Nakamura et al. | |
| 6,857,181 B2 | 2/2005 | Lo et al. | |
| 6,862,798 B2 | 3/2005 | Kruger et al. | |
| 6,870,712 B2 | 3/2005 | Chen et al. | |
| 6,891,697 B2 | 5/2005 | Nakamura et al. | |
| 6,903,900 B2 | 6/2005 | Sato et al. | |
| 6,912,106 B1 | 6/2005 | Chen et al. | |
| 6,947,255 B2 | 9/2005 | Hsiao et al. | |
| 6,949,833 B2 | 9/2005 | O'Kane et al. | |
| 6,950,277 B1 | 9/2005 | Nguy et al. | |
| 6,952,325 B2 | 10/2005 | Sato et al. | |
| 6,975,486 B2 | 12/2005 | Chen et al. | |
| 6,989,972 B1 | 1/2006 | Stoev et al. | |
| 6,995,949 B2 | 2/2006 | Nakamura et al. | |
| 7,006,326 B2 | 2/2006 | Okada et al. | |

(Continued)

FOREIGN PATENT DOCUMENTS

EP 0823726 A1 2/1998

*Primary Examiner* — Paul D Kim

(57) ABSTRACT

A method for providing a PMR pole in a magnetic recording transducer comprises providing a mask on an intermediate layer, the mask including a line having at least one side, providing a hard mask on the mask, a first portion of the hard mask residing on the at least one side and a second portion residing on a surface of the intermediate layer, the hard mask including a dry-etchable layer and a high removal ratio layer on the dry-etchable layer, removing at least part of the first portion of the hard mask, at least a portion of the line being exposed, removing the line, thereby providing an aperture in the hard mask corresponding to the line, forming a trench in the intermediate layer under the aperture using a removal process, and providing the PMR pole, at least a portion of the PMR pole residing in the trench.

17 Claims, 10 Drawing Sheets

U.S. PATENT DOCUMENTS

| | | |
|---|---|---|
| 7,070,698 B2 | 7/2006 | Le |
| 7,100,266 B2 | 9/2006 | Plumer et al. |
| 7,108,796 B2 | 9/2006 | Bergevin et al. |
| 7,120,988 B2 | 10/2006 | Le et al. |
| 7,133,252 B2 | 11/2006 | Takano et al. |
| 7,139,153 B2 | 11/2006 | Hsiao et al. |
| 7,185,415 B2 | 3/2007 | Khera et al. |
| 7,194,798 B2 | 3/2007 | Bonhote et al. |
| 7,212,379 B2 | 5/2007 | Hsu et al. |
| 7,251,878 B2 | 8/2007 | Le et al. |
| 7,253,992 B2 | 8/2007 | Chen et al. |
| 7,265,942 B2 | 9/2007 | Hixson-Goldsmith et al. |
| 7,296,338 B2 | 11/2007 | Le et al. |
| 7,324,304 B1 | 1/2008 | Benakli et al. |
| 7,349,247 B2 | 3/2008 | Saito |
| 7,369,359 B2 | 5/2008 | Fujita et al. |
| 7,381,343 B2 | 6/2008 | Gaidis et al. |
| 7,392,577 B2 | 7/2008 | Yazawa et al. |
| 7,430,095 B2 | 9/2008 | Benakli et al. |
| 7,441,325 B2 | 10/2008 | Gao et al. |
| 7,444,740 B1 | 11/2008 | Chung et al. |
| 7,464,457 B2 | 12/2008 | Le et al. |
| 7,469,467 B2 | 12/2008 | Gao et al. |
| 7,777,987 B2 | 8/2010 | Guan et al. |
| 8,125,732 B2 | 2/2012 | Bai et al. |
| 2002/0093761 A1 | 7/2002 | Payne et al. |
| 2003/0151850 A1 | 8/2003 | Nakamura et al. |
| 2004/0061988 A1 | 4/2004 | Matono et al. |
| 2004/0239320 A1 | 12/2004 | Kobayashi et al. |
| 2005/0066517 A1 | 3/2005 | Bedell et al. |
| 2005/0269288 A1 | 12/2005 | Cyrille et al. |
| 2006/0174474 A1 | 8/2006 | Le |
| 2006/0198049 A1 | 9/2006 | Sasaki et al. |
| 2006/0225268 A1 | 10/2006 | Le et al. |
| 2006/0288565 A1 | 12/2006 | Le et al. |
| 2007/0113395 A1 | 5/2007 | Dulay et al. |
| 2007/0137028 A1 | 6/2007 | Carey et al. |
| 2007/0177301 A1 | 8/2007 | Han et al. |
| 2007/0188918 A1 | 8/2007 | Im et al. |
| 2007/0211380 A1 | 9/2007 | Akimoto et al. |
| 2007/0236834 A1 | 10/2007 | Toma et al. |
| 2007/0245544 A1 | 10/2007 | Allen et al. |
| 2007/0247746 A1 | 10/2007 | Kim et al. |
| 2007/0258167 A1 | 11/2007 | Allen et al. |
| 2007/0263324 A1 | 11/2007 | Allen et al. |
| 2007/0283557 A1 | 12/2007 | Chen et al. |
| 2008/0002293 A1 | 1/2008 | Sasaki et al. |
| 2008/0002309 A1 | 1/2008 | Hsu et al. |
| 2008/0110761 A1 | 5/2008 | Lam et al. |
| 2008/0113514 A1 | 5/2008 | Baer et al. |
| 2008/0151437 A1 | 6/2008 | Chen et al. |
| 2008/0297945 A1 | 12/2008 | Han et al. |
| 2008/0316653 A1 | 12/2008 | Sasaki et al. |
| 2009/0116145 A1 | 5/2009 | Guan et al. |
| 2009/0268344 A1 | 10/2009 | Guan et al. |
| 2009/0279207 A1 | 11/2009 | Sasaki et al. |
| 2010/0112486 A1* | 5/2010 | Zhang et al. ............ 430/314 |
| 2010/0277832 A1 | 11/2010 | Bai et al. |
| 2011/0222188 A1 | 9/2011 | Etoh et al. |

* cited by examiner

METHOD FOR PROVIDING A PERPENDICULAR MAGNETIC RECORDING (PMR) POLE

BACKGROUND

FIG. 1 is a flow chart depicting a conventional method 10 for fabricating a conventional perpendicular magnetic recording (PMR) transducer. For simplicity, some steps are omitted. The conventional method 10 is used for providing a PMR pole. An intermediate layer, chemical mechanical planarization (CMP) stop layer and hard mask layer are provided, via step 12. The intermediate layer is typically aluminum oxide. The CMP stop layer may include Ru, while the hard mask layer may include NiCr. A photoresist mask is provided on the hard mask layer, via step 14. The photoresist mask includes an aperture above the portion of the intermediate layer in which the PMR pole is to be formed. A conventional aperture is formed in the hard mask layer, via step 16. Typically, this is accomplished through using a conventional ion mill. Step 16 also includes forming a conventional aperture in the CMP stop layer. Thus, through ion milling in step 16, the pattern of the photoresist mask is transferred to both the hard mask and the CMP stop layer in a conventional manner.

Using the hard mask and photoresist mask, a trench is formed in the aluminum oxide layer, via step 18. Step 18 is typically performed using an alumina reactive ion etch (RIE). The top of the trench is desired to be wider than the trench bottom. In addition, the trench may extend through the aluminum oxide intermediate layer. As a result, the PMR pole formed therein will have its top surface wider than its bottom. Consequently, the sidewalls of the PMR pole have a reverse angle. The conventional PMR pole materials are deposited, via step 20. Step 20 may include plating or sputtering ferromagnetic pole materials as well as seed layer(s). A CMP is then performed, via step 22. The stop layer provided in step 12 is used to terminate the CMP.

Fabrication of the conventional transducer may then be completed, via step 24. For example, a top bevel may be provided in the conventional PMR pole. Bevel(s) may also be a in the conventional PMR pole, via step 24. This may be accomplished by removing a top portion of the ferromagnetic pole materials in the region of the air-bearing surface (ABS). As a result, the top surface of the conventional PMR pole near the ABS is lower than the yoke portion of the PMR pole. Subsequent structures, such as a write gap and shields, may also be fabricated.

Although the conventional method 10 may provide the conventional PMR transducer, there may be drawbacks. Use of the photoresist mask and hard mask may result in relatively large variations in the critical dimension of the conventional PMR pole. The critical dimension corresponds to the track width of the conventional PMR pole. Such variations in track width may adversely affect fabrication and performance. In addition, the conventional PMR pole may be relatively large in size. Using conventional photolithography, the critical diameter of the apertures formed in step 16, and thus the trench provided in step 18, is typically greater than one hundred fifty nm. Consequently, without more, the conventional PMR poles formed using the conventional method 10 may not be usable in high density magnetic recording technology.

Accordingly, what is needed is an improved method for fabricating a PMR transducer.

SUMMARY

A method and system for providing a PMR pole in a transducer including an intermediate layer having a surface are disclosed. A mask including line(s) having side(s) is provided. A hard mask is provided on the mask. A first portion of the hard mask resides on the line side(s), while a second portion resides on the surface of the intermediate layer. The hard mask includes a dry-etchable layer and a high removal ratio layer on the dry-etchable layer. Part of the hard mask on the side(s) of the line is removed, exposing part of the line. During this removal, the high removal ratio layer has a low angle removal rate on the side(s) and a high angle removal rate on the surface of the intermediate layer. The low angle removal rate is greater than the high angle removal rate. The line is removed, providing an aperture in the hard mask. A trench is provided in the intermediate layer using a removal process. The trench has a bottom and a top wider than the bottom. The dry-etchable layer has a selectivity greater than ten during the removal process. A PMR pole is provided. At least a portion of the PMR pole resides in the trench.

DETAILED DESCRIPTION OF THE PREFERRED EMBODIMENTS

Figure 1:
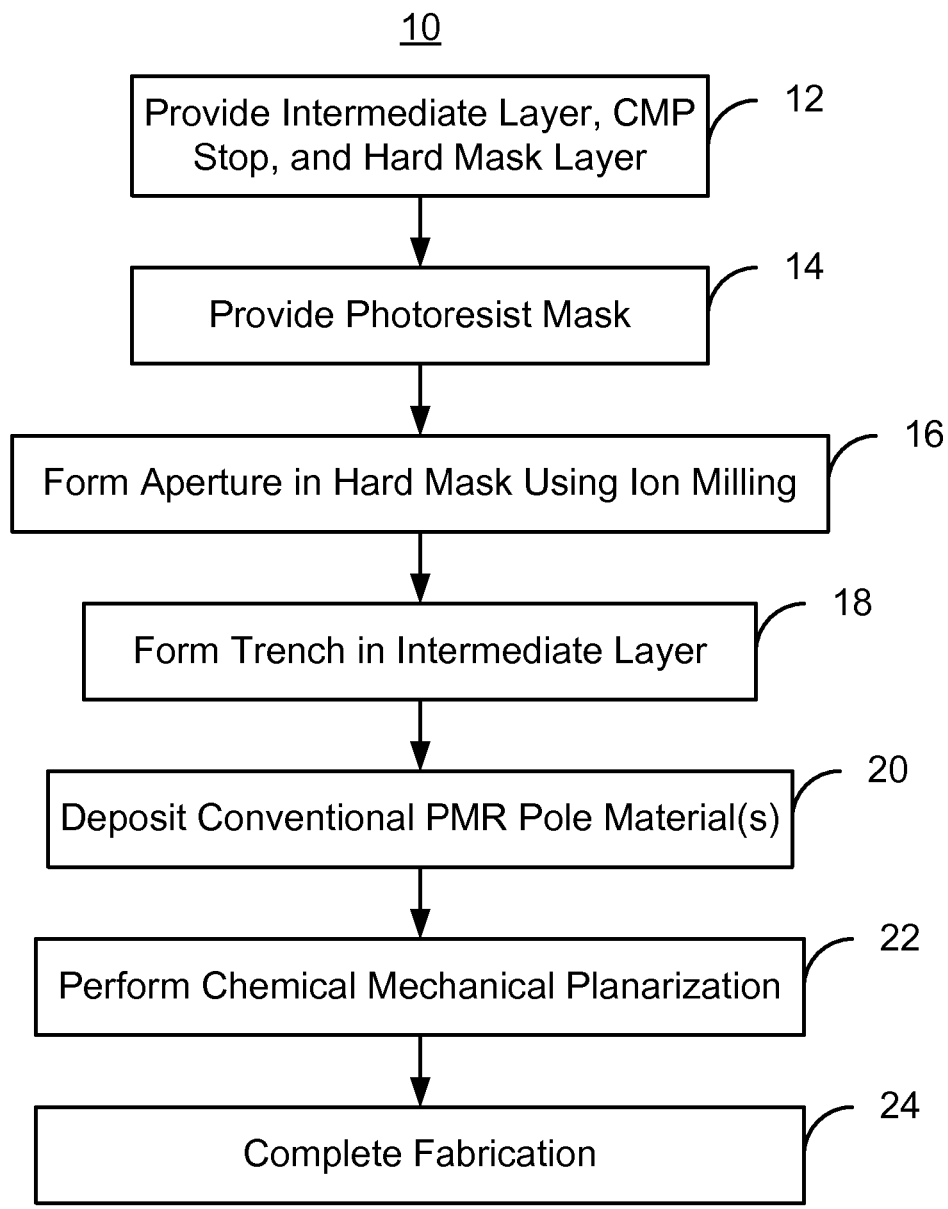
FIG. 1 is a flow chart depicting a conventional method for fabricating a PMR head.
Figure 2:
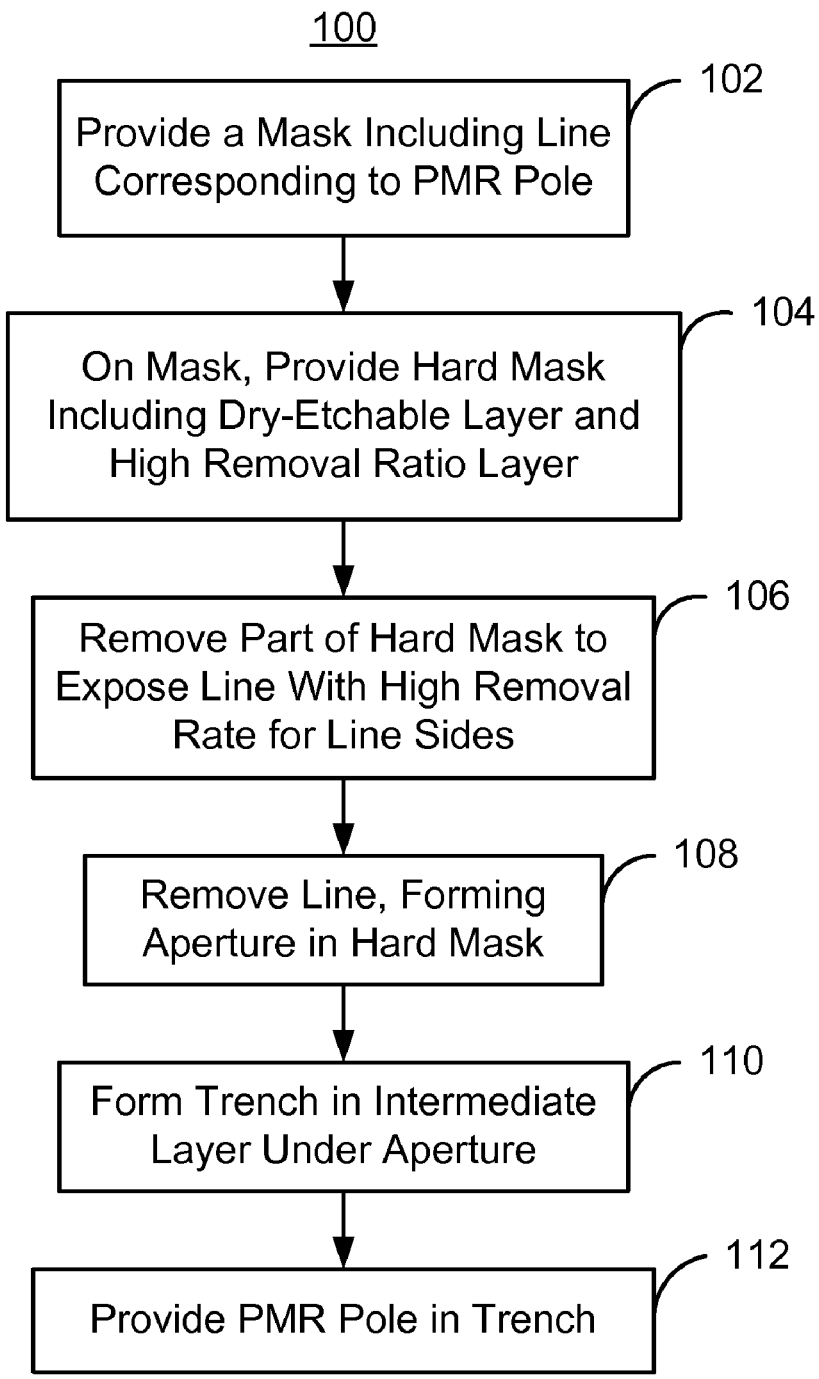
FIG. 2 is a flow chart depicting an exemplary embodiment of a method for fabricating a PMR transducer.

FIG. 2 is a flow chart depicting an exemplary embodiment of a method 100 for fabricating a PMR pole for a PMR transducer. For simplicity, some steps may be omitted. The PMR transducer being fabricated may be part of a merged head that also includes a read head (not shown) and resides on a slider (not shown) in a disk drive. The method 100 also may commence after formation of other portions of the PMR transducer. The method 100 is also described in the context of providing a single PMR pole in a single magnetic recording transducer. However, the method 100 may be used to fabricate multiple transducers at substantially the same time. The method 100 and system are also described in the context of particular layers, such as a BARC layer. However, in some embodiments, such layers may include multiple sub-layers. In one embodiment, the method 100 commences after formation of the intermediate layer(s) in which the PMR pole is to reside. In one embodiment, the intermediate layer is an insulator such as alumina. The intermediate layer may reside on an underlayer. Further, in one embodiment, the underlayer layer may be an etch stop layer.

A mask is provided on the intermediate layer, via step 102. The mask includes a line that corresponds to the location of the PMR pole. In one embodiment, the mask is a photoresist mask and may be formed using photolithographic techniques. For example, a BARC might be used in order to improve formation of the line. The BARC reduces reflections in forming a photoresist mask on the BARC layer. In such an embodiment, formation of the mask may further include removal of any BARC exposed by the mask.

A hard mask is provided on the mask, via step 104. The hard mask includes at least two layers: a dry-etchable layer and a high removal ratio (HRR) layer on the dry-etchable layer. As its name suggests, the dry-etchable layer may be removed through the use of a dry etch, such as a reactive ion etch (RIE) using the appropriate etch chemistry. For example, a material such as Ru might be used for the dry-etchable layer. Such a dry-etchable layer may be removed with a RIE using oxygen or chlorine containing gas. Another process analogous to an RIE or other dry etch might also be used to remove the dry-etchable layer. The HRR layer has a low angle removal rate and a high angle removal rate. The low angle removal rate is for a process, such as an ion mill, performed at a low angle from normal to a surface of the HRR layer. The high angle removal rate is for a process performed at a high angle from normal to the surface of the HRR layer. The HRR layer has a high ratio of the low angle removal rate to the high angle removal rate. Stated differently, the high angle removal rate is less than the low angle removal rate. Thus, the HRH layer is removed much more rapidly when milled at a low angle from normal to its surface than at a high angle from normal to its surface. In one embodiment, the low angle removal rate is at least four times the high angle removal rate. In another embodiment, the low angle removal rate is at least four and one-half times the high angle removal rate. In another embodiment, the low angle removal rate is at least six times the high angle removal rate. In some embodiments, the low angle is not more than twenty-five degrees from normal to a surface of the HRR layer. In another embodiment, the low angle is not more than fifteen degrees from normal to the surface of the HRR layer. In one such embodiment, the low angle is at least five degrees from normal to the surface of the HRR layer. The high angle is at least sixty-five degrees from normal to the surface of the HRR layer. In another embodiment, the high angle is at least seventy-five degrees and not more than eighty-five degrees from normal to this surface. Thus, in some embodiments, the high angle may be the complement of the low angle. Materials used for the HRR layer may include materials such as Cr, Ru, and/or Ta. In one embodiment, the high removal ratio layer is composed of Cr.

A portion of the hard mask is removed to expose the line, via step 106. The removal performed in step 106 exploits the high removal ratio of the HRR layer. The removal may thus be performed at a low angle to the normal to the sides of the line and, therefore, a high angle to normal from the surface of the intermediate layer. In one embodiment, a portion of the hard mask on the sides of the line of the mask is removed through an ion mill. For example, in one embodiment, an ion mill is carried out at an angle of at least sixty-five degrees and not more than ninety degrees from normal to the surface of the transducer. The angle from normal to the sides of the mask for the ion mill is thus not more than twenty-five degrees. In one such embodiment, the angle from normal to the surface of the intermediate layer is at least seventy-five and not more than eighty-five degrees. In this embodiment, the angle from normal to the sides of the mask is at least five and not more than fifteen degrees. As a result, a portion of the HRR layer on the surface of the intermediate layer is removed at the high angle removal rate. The portion of the HRR layer on at least the sides of the line is removed at the low angle removal rate. This removes the portion of the HRR layer on the sides of the line at least four times faster than the portion on the surface of the intermediate layer. Once part of the HRR layer is removed on the side(s) of the line, the exposed portion of the underlying dry-etchable layer may also be removed. An aperture in the hard mask may thus be provided on the side(s) of the line. At least part of the side(s) of the line is, therefore, exposed. However, the portion of the HRR layer on the surface of the intermediate layer is removed at a significantly lower rate. Consequently, this portion of the hard mask may not be completely removed. Thus, the underlying dry-etchable layer of the hard mask on the intermediate layer may remain substantially undisturbed.

The line in the mask is removed, via step 108. In one embodiment, step 106 includes performing a lift-off of the line. The lift-off is possible because at least part of the line is exposed in step 106 and thus made accessible to the etchant used. The hard mask including an aperture corresponding to the line is thus formed. The aperture in the hard mask resides in substantially the position occupied by the line.

A trench is formed in the intermediate layer under the aperture of the hard mask, via step 110. The trench has a bottom and a top wider than the bottom. It has been determined that such a profile for a trench may be due in part to material removed from the intermediate layer being redeposited within the trench. Consequently, the trench formed is appropriate for a PMR pole. In one embodiment, the trench extends through the intermediate layer. However, in another embodiment, the trench might extend only partially through the intermediate layer. In one embodiment, step 110 includes performing a RIE configured to etch the intermediate layer, such as an aluminum oxide RIE. In addition, the selectivity of the removal process for the intermediate layer in step 110 is high. In one embodiment, the selectivity is at least ten. Stated differently, the intermediate layer is removed at a rate that is at least ten times the removal rate of the dry-etchable layer. In one such embodiment, the selectivity is at least fifty. Thus, although removable using a process, such as an RIE, the dry-etchable layer is not susceptible to removal using the same process as the intermediate layer. Similarly, the intermediate layer may not be susceptible to removal in the dry-etch used to remove the dry-etchable layer of the hard mask.

A PMR pole is provided, via step 112. At least a portion of the PMR pole resides in the trench. In one embodiment, only part of the PMR pole resides within the trench in the intermediate layer. Thus, the top of the PMR pole would be above the top of intermediate layer. In an alternate embodiment, the entire PMR pole resides within the trench. Formation of the PMR pole in step 112 may include providing one or more nonmagnetic layers in the trench. Such nonmagnetic layer(s) might be used to adjust the critical dimension, and thus the track width, of the PMR pole. In addition, seed layer(s) may also be provided. Thus, the PMR pole would reside on such a nonmagnetic layer(s). In one embodiment, the nonmagnetic layer(s) used for track width adjustment may be provided using atomic layer deposition (ALD). As part of step 112 a planarization stop layer might also be provided. In one embodiment, the planarization stop layer is provided on the nonmagnetic layer(s). The planarization stop layer may be a CMP stop layer. In one such embodiment, the planarization stop layer includes Ru. In another embodiment, the planarization stop layer may also function as a seed layer. The layer(s) for the PMR pole may also be blanket deposited. A planarization, such as a CMP, may be performed. In addition, the geometry of the PMR pole might be further adjusted using an ion beam etch. Top and/or bottom bevels may also be formed for the PMR pole. The bottom bevel might be formed by continuing filling of the trench using the nonmagnetic layer(s) such that a portion of the PMR pole in proximity to the ABS is higher than a portion of the PMR pole in a yoke region. A top bevel might be formed by removing a portion of the PMR pole material after the CMP is performed. Thus, the PMR pole may be formed. Although described above as part of formation of the PMR pole, at least some of the steps of providing the nonmagnetic layer, the planarization stop layer and/or the seed layer may be considered separate from providing the PMR pole.

Using the method 100, at least part of a PMR transducer may be formed. Use of the dry-etchable layer in the hard mask may improve the predictability of the critical dimensions of the PMR pole. As discussed above, the selectivity of the removal process used in formation of the trench in the intermediate layer is high with respect to the dry-etchable layer. Consequently, the dry-etchable layer may be used in the hard mask. In addition, removal of the dry-etchable layer may not remove much of the intermediate layer. Thus, removal of the dry-etchable layer may leave the profile of the trench substantially unaffected. This is in contrast to a wet etch process. The critical dimensions of the trench and the PMR pole may, therefore, be preserved.

The method 100 may also allow for smaller PMR pole dimensions. A photoresist line is used to provide the aperture in the hard mask. In one embodiment, the line in the mask may have a critical dimension, or width, that is not larger than two hundred nanometers. The critical dimension of the line might also be not more than one hundred nanometers. As a result, the critical dimension for the PMR pole may be the same as or smaller than the critical dimension of the trench. The PMR transducer formed may thus be used at higher densities. For example, the PMR transducer formed might be usable in 400 Gb/in$^2$ or higher density transducers. Further, use of the hard mask having at least two layers allows for thinner hard masks to be employed. In one embodiment, the hard mask may have a thickness of not more than one thousand Angstroms. In another embodiment, the hard mask thickness may be seven hundred Angstroms or less. Consequently, variations in the critical dimension of the pole may be reduced and fabrication improved. In addition, because a lift-off the line may be performed in step 108 and the materials used in the hard mask are easy to fabricate, manufacturing of the PMR transducer may be simplified. Using the method 100, therefore, a PMR transducer usable at higher densities may be fabricated.

Figure 3:
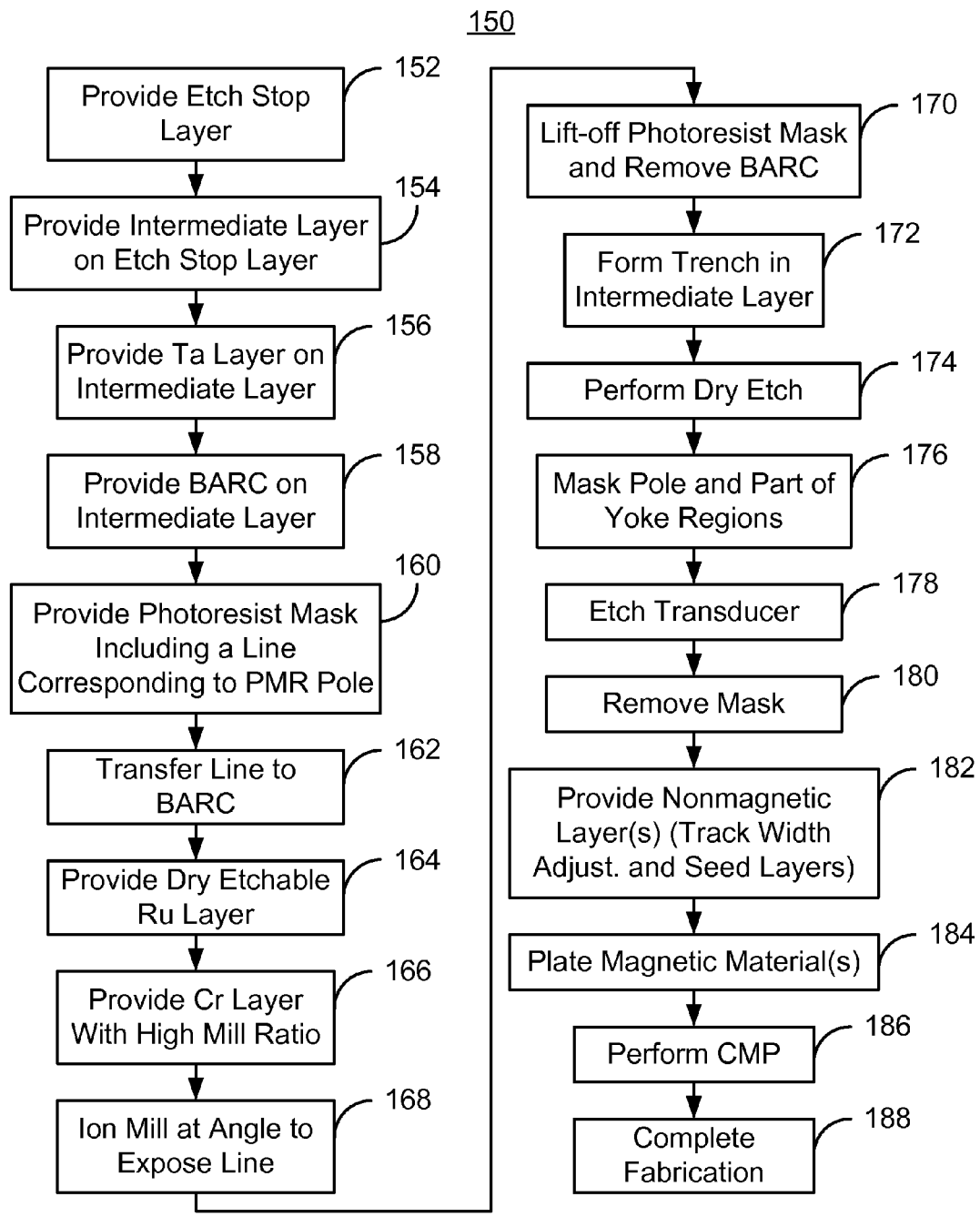
FIG. 3 is a flow chart depicting another embodiment of a method for fabricating a PMR transducer.

FIG. 3 is a flow chart depicting another exemplary embodiment of a method 150 for fabricating a PMR transducer. For simplicity, some steps may be omitted. FIGS. 4-18 are diagrams depicting an exemplary embodiment of a PMR transducer 200 as viewed from the ABS during fabrication and from the yoke region. For clarity, FIGS. 4-18 are not to scale. Referring to FIGS. 3-18, the method 150 is described in the context of the PMR transducer 200. However, the method 150 may be used to form another device (not shown). The PMR transducer 200 being fabricated may be part of a merged head that also includes a read head (not shown) and resides on a slider (not shown) in a disk drive. The method 150 also may commence after formation of other portions of the PMR transducer 200. The method 150 is also described in the context of providing a single PMR transducer. However, the method 150 may be used to fabricate multiple transducers at substantially the same time. The method 150 and device 200 are also described in the context of particular layers, such as a bottom antireflective coating (BARC) layer. However, in some embodiments, such layers may include multiple sublayers.

Figure 4:
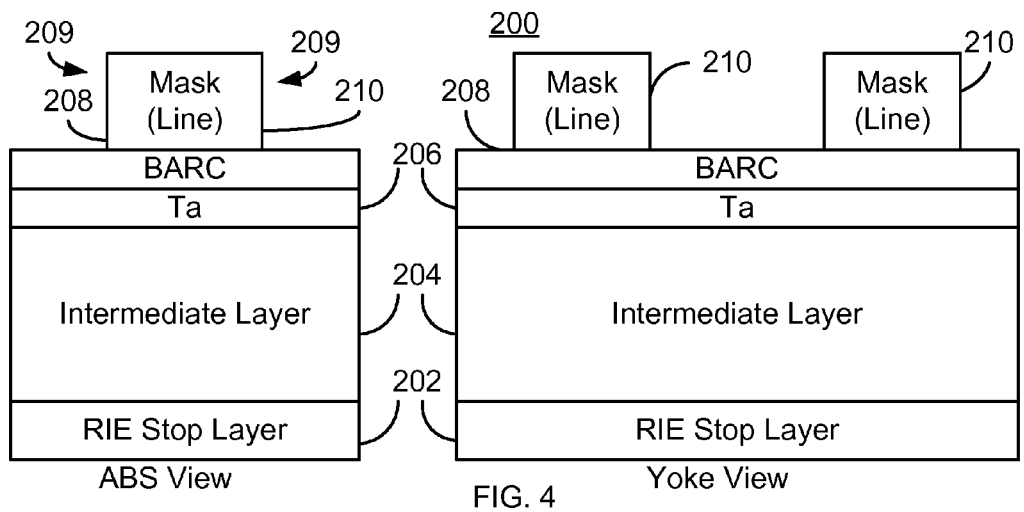
FIGS. 4-18 are diagrams depicting exemplary embodiments of a perpendicular magnetic recording transducer during fabrication.
Figure 5:
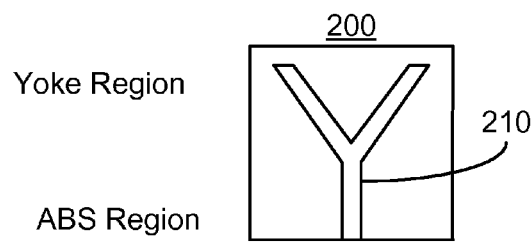

An etch stop layer, or underlayer, is provided, via step 152. The layer may be used as a stop for an aluminum oxide RIE. For example, a NiCr etch stop layer may be provided. An intermediate layer is provided on the etch stop layer, via step 154. The intermediate layer is nonmagnetic and may be a dielectric layer, such as an aluminum oxide layer. A critical dimension layer, for example including Ta, may be provided, via step 156. The critical dimension layer provided in step 156 may be used to assist in ensuring that the top dimension of the PMR pole being formed is relatively constant. A BARC is provided on the intermediate layer, via step 158. A photoresist mask is provided on the BARC, via step 160. The photoresist mask includes a line that corresponds to the location of the PMR pole. FIGS. 4-5 depict a portion of the PMR transducer 200 after step 160 is performed. FIG. 4 is a cross-sectional view of the ABS and yoke regions, while FIG. 5 is a plan view of the ABS and yoke regions. Cross-sectional views in FIGS. 4 and 6-18 are labeled as ABS and yoke views. In the embodiment shown, an underlayer 202 that may also functions as an etch stop layer 202, is shown. In addition, an intermediate layer 204 is also depicted. Also shown are a Ta layer 206, a BARC 208 and a mask 210. In the embodiment shown, the mask 210 consists of a line having sides 209 in the region of the PMR pole. However, in another embodiment, the mask 210 may include other features. In addition, the mask 210 used may include a line for each PMR pole being formed. In the yoke region, the mask 210 includes other features. In one embodiment, the mask 210 includes two lines, in the yoke region. Thus, the mask 210 may form a Y-shape shown in FIG. 5 as viewed from above.

Figure 6:
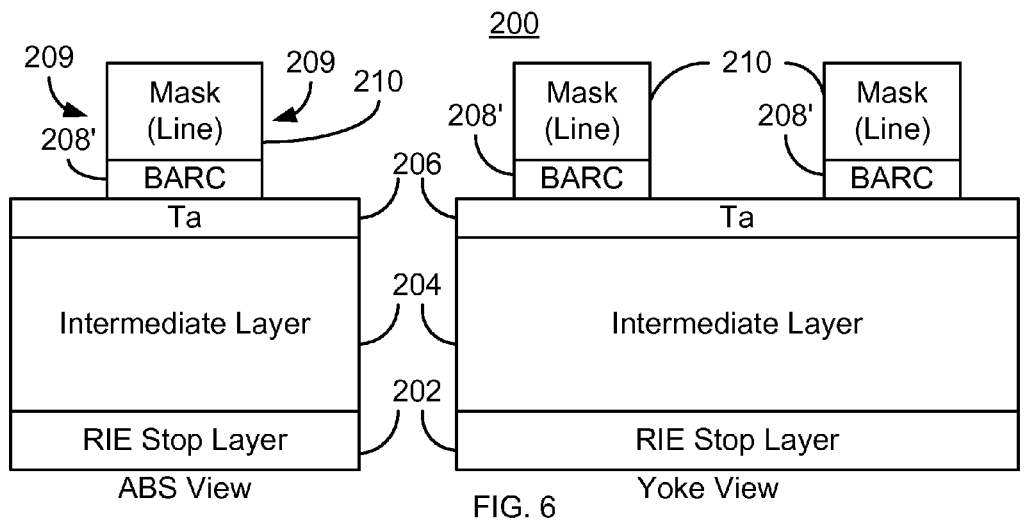

The pattern of the mask 208 is transferred to the BARC 208, via step 162. FIG. 6 depicts the PMR transducer 200 after step 162 is performed. Thus, the BARC 208' resides only under the mask 210. The remaining portion of the BARC layer 208 has been removed.

Figure 7:
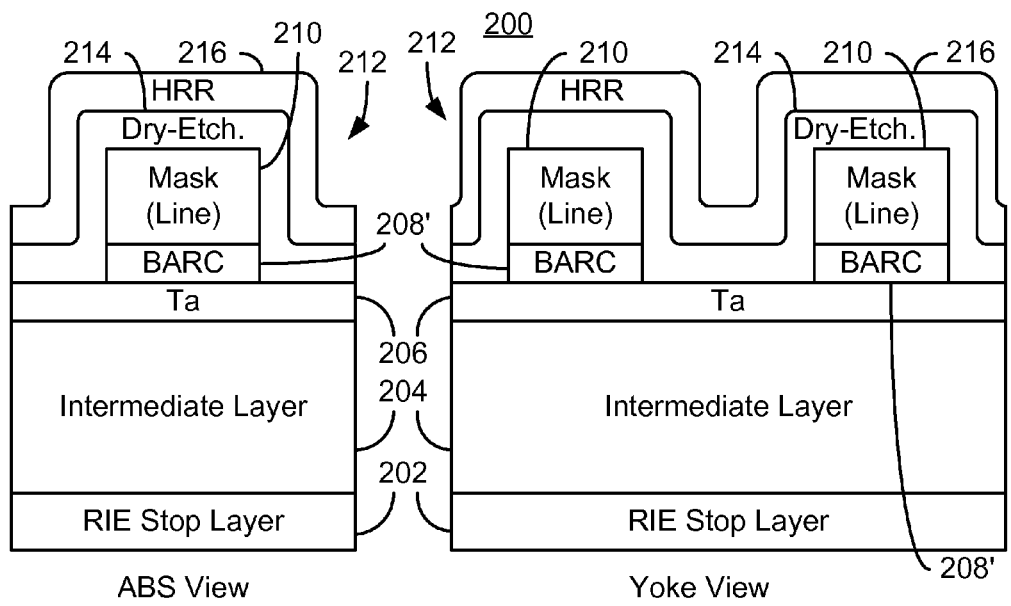

A hard mask is provided on the PMR transducer 200, via steps 164 and 166. Step 164 includes deposition of a dry-etchable layer, as is described above. The dry-etchable layer may include, for example, materials such as Ru. In such an embodiment, the Ru layer may also act as a CMP stop layer. Step 166 includes as well as deposition of a HRR layer, such as Cr. The HRR layer provided in step 166 is analogous to that described above. FIG. 7 depicts the PMR transducer 200 after steps 164 and 166 are performed. Thus, a hard mask layer 212 including dry-etchable layer 214 and HRR layer 216 are shown. For clarity, the sides 209 of the line 210 are not labeled in FIGS. 7-18.

An ion mill is performed at an angle to expose the line of the mask 208, via step 168. The angle is a low angle from normal to the surface of the sides 209 of the line, but a high angle with respect to the surface of the intermediate layer 204. For example, in one embodiment, the angle may be not more than twenty-five degrees from normal to the sides 209. Thus, the angle is at least sixty-five degrees from normal to the surface of the intermediate layer 204. In another embodiment, the angle may be not more than fifteen degrees from normal to the sides 209. Thus, the angle is at least seventy-five degrees from normal to the surface of the intermediate layer 204. In one such embodiment, the angle is not less than five degrees from normal to the sides 209 and, therefore, not less than eighty-five degrees from normal to the surface of the intermediate layer 204. Consequently, the portion of the high removal ratio layer 216 on the sides of the marks 210 is removed at a much higher rate than the high removal ratio layer 216 on the surface of the intermediate layer 204. In one embodiment, the ion milling rate of the portion of the high removal ratio layer 216 on the sides 209 is at least four times the ion milling rate of the high removal ratio layer 216 on the surface of the intermediate layer 204. In another embodiment, the ion milling rate of the portion of the high removal ratio layer 216 on the sides 209 is at least four and one-half times the ion milling rate of the high removal ratio layer 216 on the surface of the intermediate layer 204. In another embodiment, the ion milling rate of the portion of the high removal ratio layer 216 on the sides 209 is at least six times the ion milling rate of the high removal ratio layer 216 on the surface of the intermediate layer 204.

Figure 8:
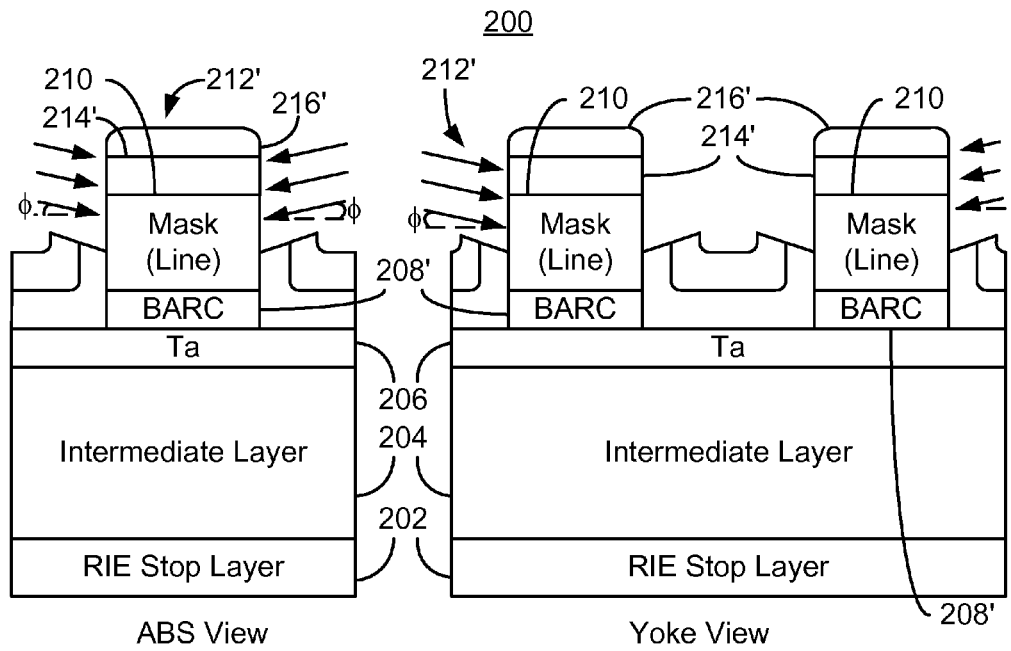

FIG. 8 depicts the PMR transducer after step 168 has been performed. Thus, a portion of the hard mask 212' has been removed. In particular, a portion of the HRR layer 216 on the sides 209 of the mask 210 has been removed. Remaining portion of the HRR layer 216' still resides on the surface of the intermediate layer 204. This is because the ion mill (shown at angle φ to the normal to the surface of the sides 209) is performed at a low angle to the normal to the surface of the sides 209. As a result, the portion of the HRR layer 216 on the sides 209 is removed at a higher rate than the portion of the HRR layer 216' on the surface of the intermediate layer 204. In one embodiment, the portion of the HRR layer 216 on the sides is removed at least four times faster than the portion of the HRR layer 216 on the surface of the intermediate layer 204. In another embodiment, the portion of the HRR layer 216 on the sides is removed at least four and a half times faster than the portion of the HRR layer 216 on the surface of the intermediate layer 204. In yet another embodiment, the portion of the HRR layer 216 on the sides is removed at least six times faster than the portion of the HRR layer 216 on the surface of the intermediate layer 204. Thus, the HRR layer 216 may be considered to act analogous to a stop layer for the removal process only for the portion of the HRR layer 216 on the surface of the intermediate layer 204. Consequently, a portion of the HRR layer 216 is removed on the sides 209 of the line 210. A remaining portion of the HRR layer 216' remains. As a result, a portion of the dry-etchable layer 214 on the sides 209 of the line 210 may also be removed, while the portion of the dry-etchable layer 214' on the surface of the intermediate layer 204 remains. Thus, as is shown in FIG. 8, the line 210 is exposed without removing the hard mask 212' on the surface of the intermediate layer 204. A portion 214' of the dry-etchable layer, as well as a portion of the HRR layer 216', also may remain on the top of the mask 210. However, the sides 209 of the line of the mask 210 are at least partially exposed.

Figure 9:
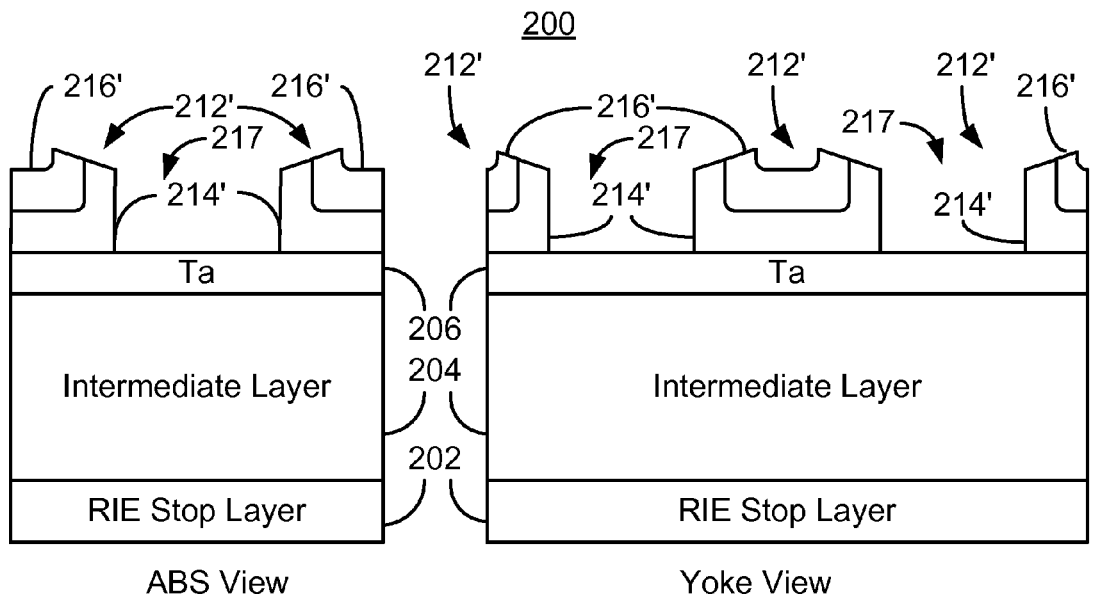

A lift-off is performed, via step 170. As a result, the remaining portion 210 of the line is removed. In addition, the remaining portion 208' of the BARC that was under the line 210 is removed also in step 170. FIG. 9 depicts the PMR transducer 200 after step 170 is completed. Thus, an aperture 217 in the hard mask 212' has been formed. The aperture 217 exposes the underlying intermediate layer 204 and corresponds to the line of the mask 210. As a result, the location and size of the aperture 217 match that of the line 210.

Figure 10:
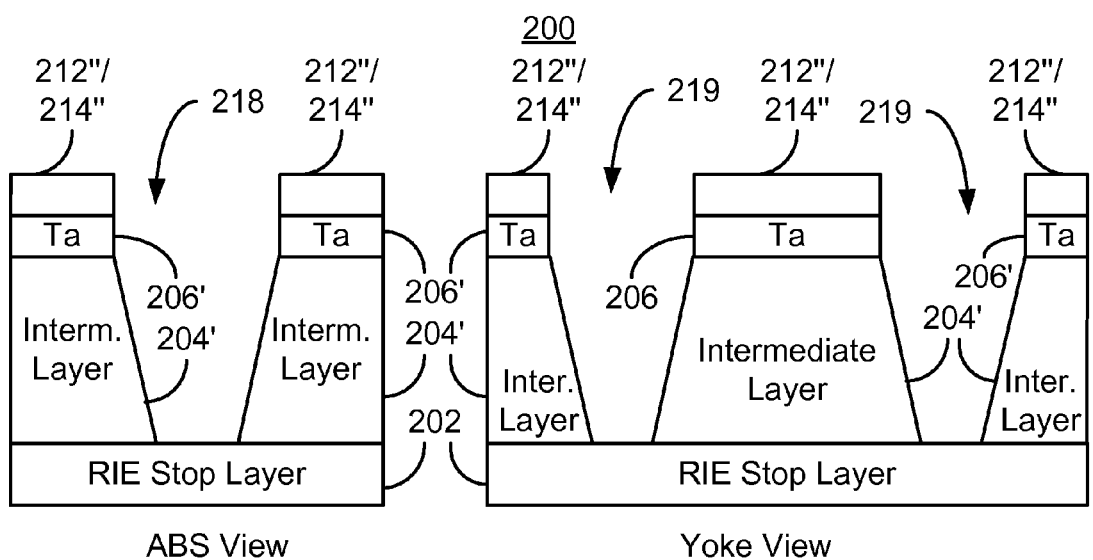

A RIE is performed to form a trench in the intermediate layer 204, via step 172. In one embodiment, the RIE is utilizing an etch chemistry for aluminum oxide. FIG. 10 depicts the PMR transducer after step 172 is performed. For clarity, the aperture 217 is no longer labeled. Instead, the trench 218 formed under the aperture is labeled. A trench 218 has been formed in the intermediate layer 204' in the ABS region of the transducer 200. The trench 218 has a bottom and a top wider than the bottom. As the mask 210 was Y-shaped, trenches 219 have been formed in the intermediate layer 204' in the yoke region. The hard mask 212" remains. In the embodiments shown, only the dry-etchable layer 214" of the hard mask 212" remains. Thus, these layers are labeled 212'/214'. In another embodiment, a portion of the HRR layer 216' (not shown) may also remain.

Figure 11:
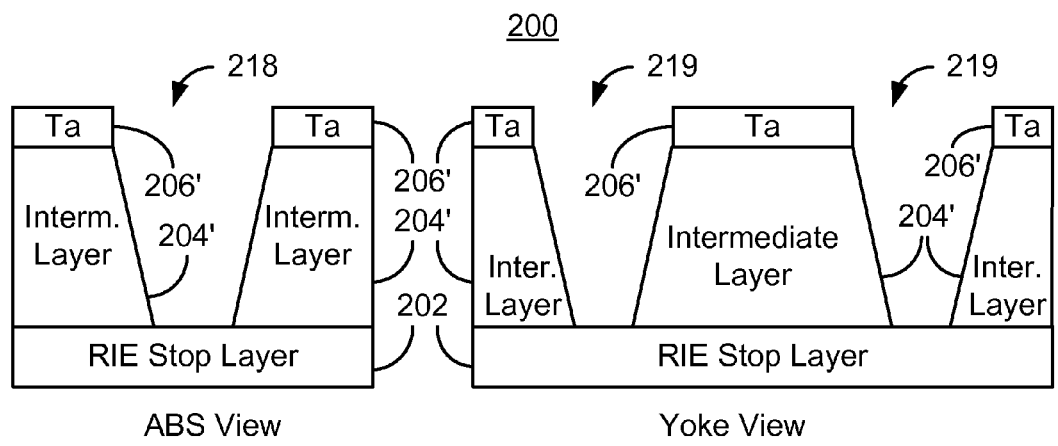

A dry-etch is performed to remove the dry-etchable layer, via step 174. Because the dry-etchable layer is exposed, a remaining portion of the hard mask 212' may be removed. In another embodiment, some of the dry etchable layer 214" may be left. FIG. 11 depicts the transducer 200 after step 174 is preformed. Thus, the hard mask 212" is removed and the Ta layer 206' exposed.

Figure 12:
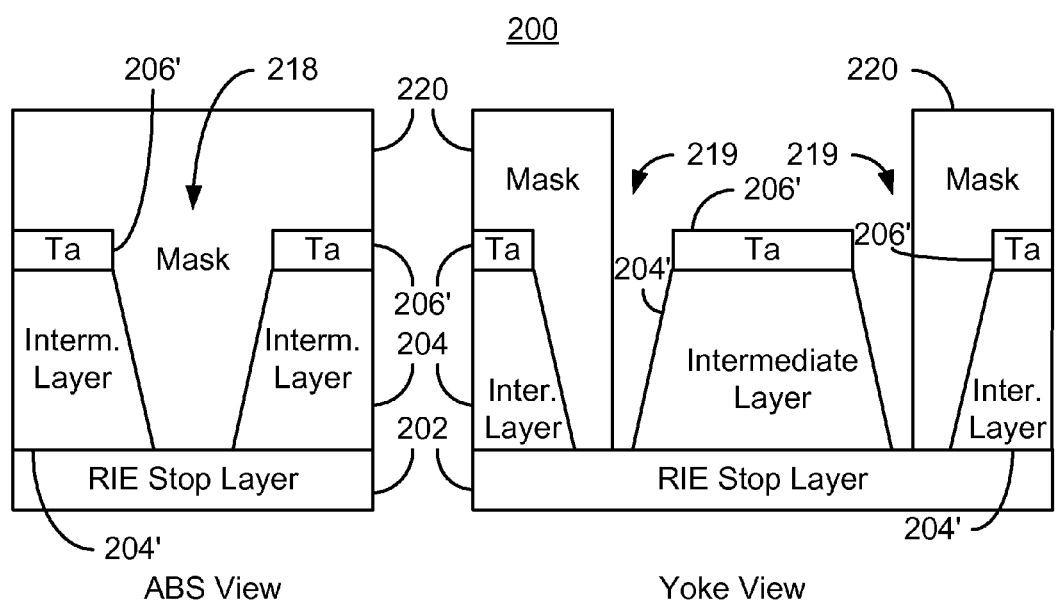

The portion of the intermediate layer in the center of the yoke region, where the yoke is to be formed, is desired to be removed. Consequently, a photoresist mask is provided, via step 176. FIG. 12 depicts the PMR transducer 200 after step 176 is performed. A photoresist mask 220 covers trench 218 in the ABS region of the transducer 200. However, portions of the trenches 219 in the yoke region are exposed. In addition, the central portion of the intermediate layer 204' between the trenches 219 is also exposed. Note that in other embodiments, steps 174 and 176 may be reversed. In such an embodiment, the dry-etchable layer 214" in the ABS region is preserved.

Figure 13:
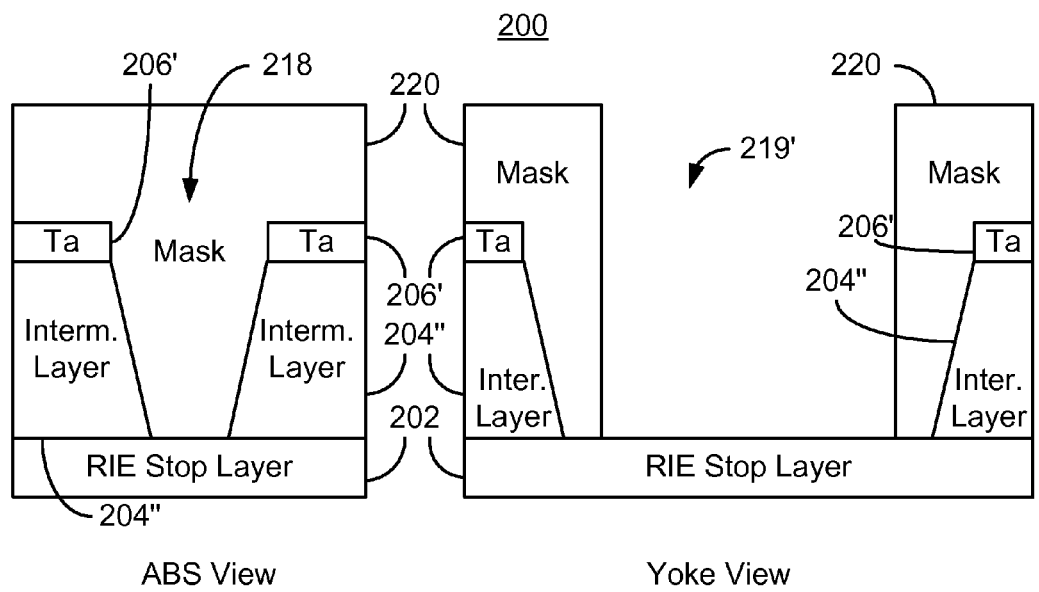

The PMR transducer 200 is etched, via step 178. The etch removes the exposed part of the intermediate layer 204' in the yoke region. In addition, the exposed portion of the Ta layer 206' is also removed. FIG. 13 depicts the PMR transducer 200 after step 178 is performed. Thus, a new, single trench 219' is formed in the yoke region.

Figure 14:
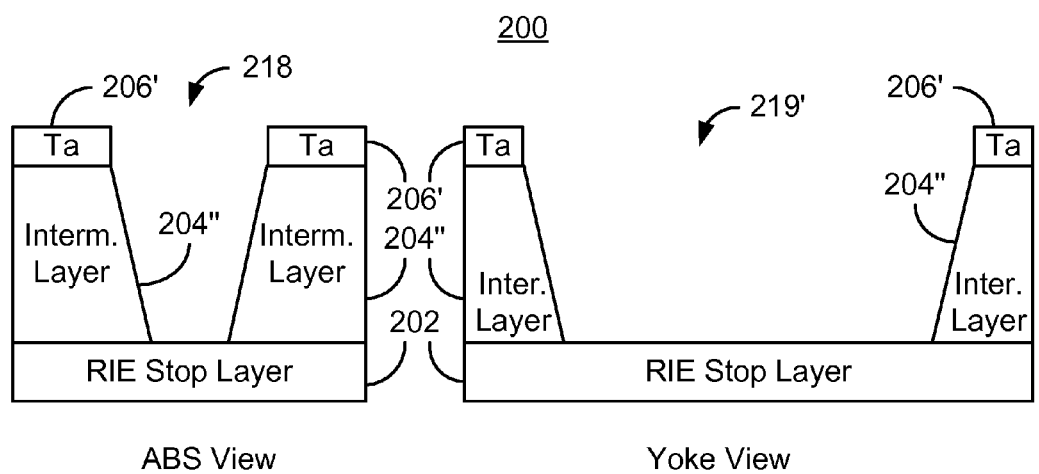

The mask 220 is removed, via step 180. FIG. 14 depicts the PMR transducer 200 after step 180 is performed. Thus, the trench 218 in the ABS region and the trench 219' in the yoke region are both exposed.

Figure 15:
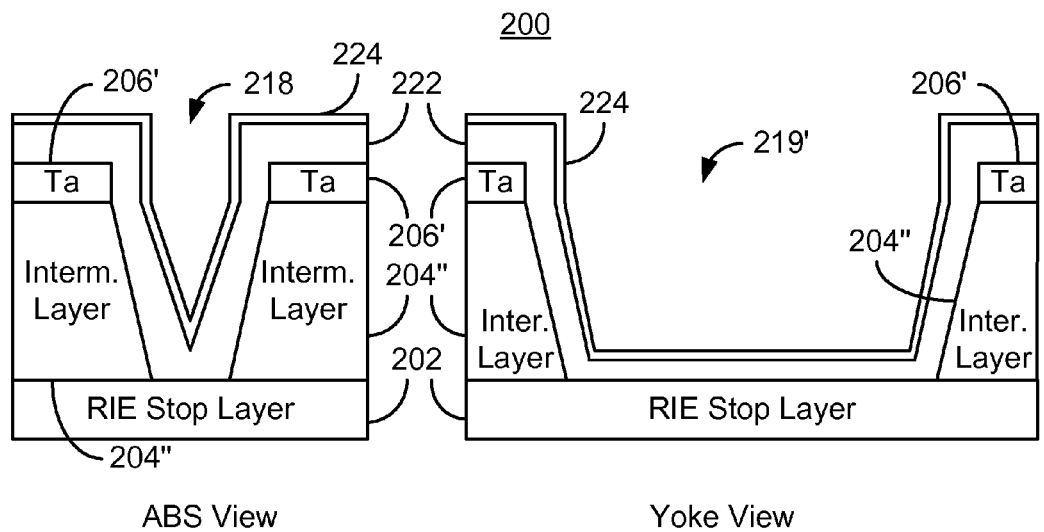

The PMR pole is then formed. This may occupy a number of steps, for example steps 182 through 186. In one embodiment, at least one nonmagnetic layer is provided in the trench 218, via step 182. At least a portion of the nonmagnetic layer resides in the trench 218. In one embodiment, step 182 may include providing a track width adjustment layer, as well as a seed layer. Formation of the track width adjustment layer may, for example, be performed by depositing aluminum oxide using ALD. However, in another embodiment, another method and/or material for the track width adjustment layer may be used. Because it is magnetically separate from the pole being formed, the track width adjustment layer may be used to reduce the critical diameter of the pole being formed. Stated differently, the nonmagnetic layer may be considered to make the trench 218 less wide and, in one embodiment, shallower. Thus, the thickness of the nonmagnetic layer may be used to tune the width and height of the PMR pole being formed. In particular, the width the PMR pole may be reduced by twice the thickness of the nonmagnetic layer. In addition, the trench formed in step 172 may be configured to be thinner in a region near the final location of the ABS than at the yoke region. In such an embodiment, the trench 218 may be partially filled by the nonmagnetic layer(s) in the ABS region. In such a case, a bottom bevel may be formed. In addition, a seed layer may be deposited on the track width adjustment layer. In some embodiments, the seed layer may also be a CMP stop layer. In another embodiment, the seed layer might be magnetic. Alternatively, step 182 might be omitted. FIG. 15 depicts the PMR transducer 200 after step 182 is performed. Thus, a nonmagnetic layer 222 and a seed layer 224 are all shown. A portion of each of the nonmagnetic, track width adjustment layer 222 and the seed layer 224 resides in the trench 218. Thus, a portion of the nonmagnetic layer 222 is above the top of the intermediate layer 204'. In addition, as can be seen in FIG. 15, the nonmagnetic layers 222 and 224 do not fill the wider trench 219' in the yoke region. Thus, a bottom bevel may be provided for the pole.

Figure 16:
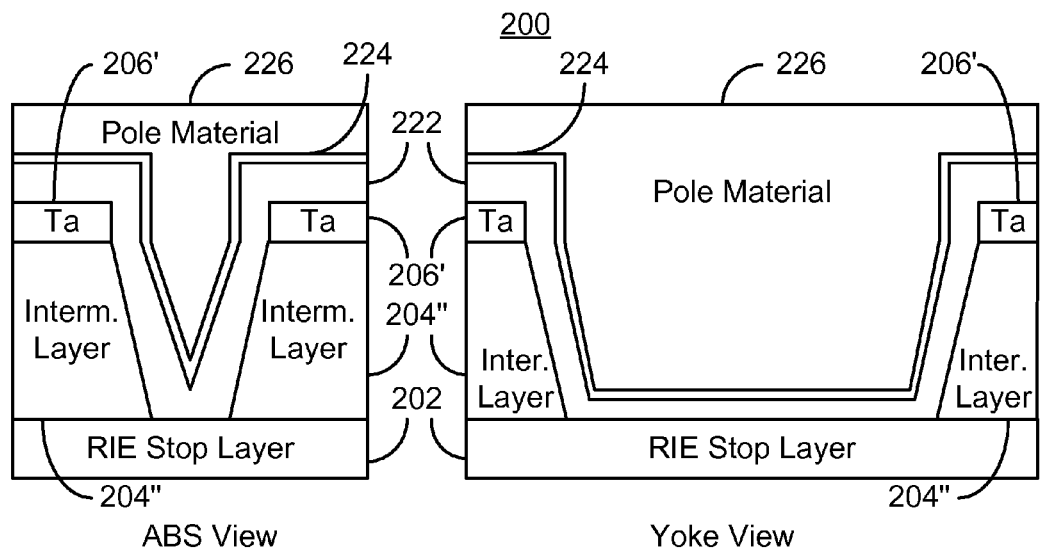

PMR pole layer(s) may be provided, via step 184. Step 184 may include plating the PMR pole layer(s). However, other deposition methods might be used. In one embodiment, a single layer is used. However, in another embodiment, multiple layers might be used for the PMR pole. Consequently, multiple layers might be deposited in step 184. In the embodiment described, the PMR pole layer(s) are blanket deposited. However, in another embodiment, masking might be used. In one embodiment, the PMR pole layer is plated on the seed layer 224. FIG. 16 depicts the PMR transducer 200 after step 184 is performed. Thus, the PMR pole layer 226 resides in the trench 218. For clarity, the trench 218 is not labeled in FIGS. 15-18. Another portion of the PMR pole layer 226 may also reside on and next to the Ta layer 206'. Thus, a portion of the PMR pole layer 226 is above the top of the intermediate layer 204'.

Figure 17:
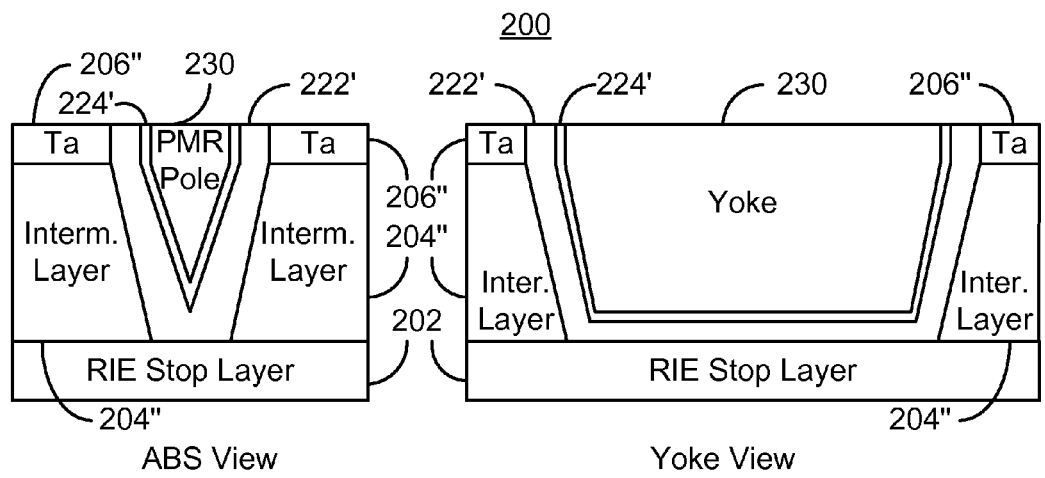
Figure 18:
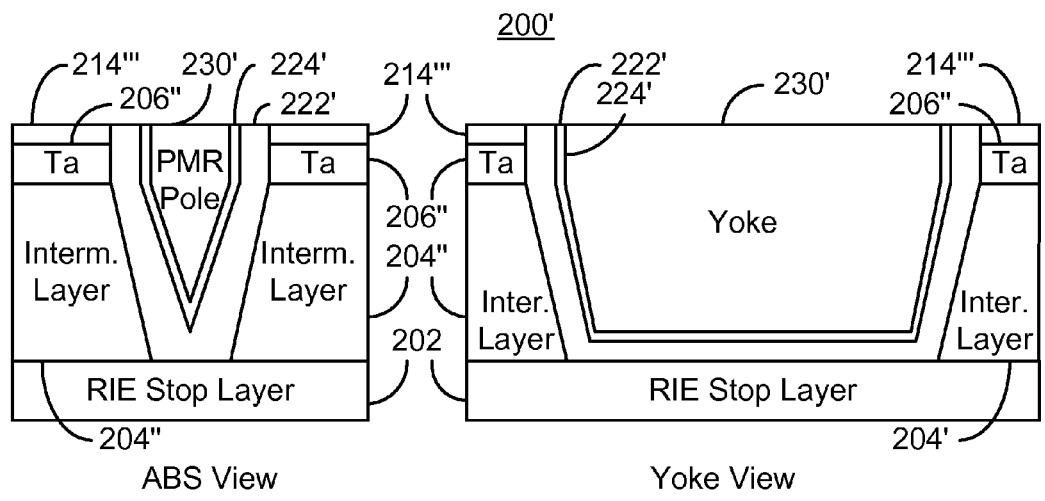

A CMP, or other planarization selected, is performed, via step 186. The CMP planarization may terminate when at least a portion of the Ta layer 206' remains. In another embodiment, where a portion of the dry-etchable layer 214" remains and may be used as a CMP stop layer, the CMP may terminate in the dry-etchable layer 214". FIGS. 17 and 18 depict the PMR transducer 200 after step 186 has been performed. FIG. 17 depicts a transducer 200 in which the dry-etchable layer 214" was completely removed. FIG. 18 depicts a transducer 200' in which at least some of the dry-etchable layer 214'" remains to be used as a stop layer. The PMR poles 230 and 230' have been formed from the PMR pole layer(s) 226. In addition, a portion of the seed layer 222 and track width adjustment layer 220 have been removed. Consequently, only portions of the seed layer 224" and track width adjustment layer 222' remain after step 186 is performed. In addition, in the PMR transducer 200, only a portion 206" of the Ta layer remains. In another embodiment, the Ta layer maybe removed completely. In the embodiment shown, only a portion of the PMR pole 230 resides within the trench. This portion of the PMR pole 230 has a top wider than the bottom. Stated differently, there is a negative angle (as measured from vertical) for these portions of the sidewalls of the PMR pole 230. A remaining portion of the PMR pole 230 is next to the Ta layer 206', nonmagnetic layer 220', and remaining seed layer 222'. In the embodiment 200' shown in FIG. 18, the PMR pole 230 is also adjacent to any remaining portion of the dry-etchable layer 214'". The sidewalls for this portion of the PMR pole 230 may be substantially vertical.

Fabrication of the transducer may then be completed, via step 188. Step 188 may include providing a top bevel or other structure to improve the performance of the transducer 200. In addition, other structures may be provided. For example, a write gap and trailing shield may be provided.

Using the method 150, at least part of the PMR transducer 200/200' may be formed. Because of the use of the dry-etchable layer 214", the trenches 218, 219, and 291' remain substantially unchanged by the removal of the dry-etchable layer. Thus, the critical dimensions (e.g. widths) of the trenches 218, 219, and 219' are not increased in an unpredictable manner. Thus, the desired critical dimension of the pole 230/230' may be preserved. Further, as the hard mask 212 may be easily fabricated, this benefit may be achieved without adversely affecting manufacturing of the PMR transducer 200/200'. The method 150 utilizes the photoresist line of the mask 210 to provide the aperture 213 in the hard mask 210'. Because the hard mask includes both the dry-etchable layer 214 and the high removal ratio layer 216', the desired hard mask may be provided. In particular, a thinner hard mask 212' may be used. Thus, variations in the width of the PMR pole 230 may be reduced. Because a dry-etchable layer 214 is used, the remaining hard mask 212 may be easily removed when desired. Further, the line 210 is exposed using an ion mill that may be better controlled through the use of endpoint detection. Lift-off may also be used to remove the line. Because a lift-off may be performed, the hard mask 210' may have sharper edges at the aperture 213. Consequently, the edges of the PMR pole 220' may be better defined. In one embodiment, the line in the mask 208' may have a critical dimension, or width, that is not larger than two hundred nanometers. In another embodiment, the critical dimension of the line 208 might also be not more than one hundred nanometers. As a result, the critical dimension for the PMR pole 230 may be not more than two hundred nanometers in one embodiment. In another embodiment, the critical dimension might be not more than one hundred nanometers. The PMR transducer 200/200' may thus be used at higher densities. For example, the PMR transducer 200/200' might be usable in 400 Gb/in$^2$ or higher density transducers. Using the method 150, therefore, a PMR transducer 200/200' usable at higher densities may be fabricated.

We claim:

1. A method for providing a perpendicular magnetic recording (PMR) pole in a magnetic recording transducer including an intermediate layer having a surface, the method comprising:
    providing a mask on the intermediate layer, the mask including a line having at least one side;
    providing a hard mask on the mask, a first portion of the hard mask residing on the at least one side and a second portion of the hard mask residing on the surface of the intermediate layer, the hard mask including a dry-etchable layer and a high removal ratio layer on the dry-etchable layer;
    removing at least part of the first portion of the hard mask, at least a portion of the line being exposed, the high removal ratio layer having a low angle removal rate on the at least one side and a high angle removal rate on the surface of the intermediate layer, the low angle removal rate being greater than the high angle removal rate;
    removing the line, thereby providing an aperture in the hard mask corresponding to the line;
    forming a trench in the intermediate layer under the aperture using a removal process, the trench having a bottom and a top wider than the bottom, the dry-etchable layer having a selectivity greater than ten during the removal process; and
    providing the PMR pole, at least a portion of the PMR pole residing in the trench.

2. The method of claim 1 wherein the dry-etchable layer is removable in a reactive ion etch using at least one of a chlorine containing gas and an oxygen containing gas.

3. The method of claim 2 wherein the transducer includes a yoke portion and wherein the method further includes:
    removing a portion of the dry-etchable layer in the yoke portion using the reactive ion etch including using the at least one of the chlorine containing gas and the oxygen containing gas.

4. The method of claim 1 wherein the high milling ratio layer includes Cr.

5. The method of claim 1 wherein the dry-etchable layer includes Ru.

6. The method of claim 1 wherein the selectivity is at least fifty.

7. The method of claim 1 wherein the step of removing the at least the part of the portion of the hard mask layer further includes:
    ion milling at a low angle from a normal to the at least one side of the line, the low angle being not more than twenty five degrees from the normal to the at least one side.

8. The method of claim 7 wherein the low angle is not more than fifteen degrees from the normal to the at least one side.

9. The method of claim 7 wherein the low angle is at least five degrees and not more than fifteen degrees from the normal to the at least one side.

10. The method of claim 1 wherein the line includes a photoresist line.

11. The method of claim 10 wherein the step of removing the line further includes:
   performing a lift off of the line.
12. The method of claim 1 wherein the step of forming the trench further includes:
   performing at least one reactive ion etch (RIE) to remove a portion of the intermediate layer.
13. The method of claim 12 further comprising:
   providing an RIE etch stop layer under the intermediate layer, a portion of the RIE etch stop layer forming a bottom of the trench.
14. The method of claim 1 further comprising:
   providing a nonmagnetic layer after the step of forming the trench, at least a portion of the nonmagnetic layer residing in the trench, the PMR pole residing on the nonmagnetic layer.
15. The method of claim 1 further comprising:
   providing a bottom antireflective coating (BARC) under the mask;
   transferring the line to the BARC before the step of providing the hard mask layer, a remaining portion of the BARC residing under the line; and
   removing the remaining portion of the BARC under the line after the line has been removed.
16. The method of claim 1 further comprising:
   providing a Ta layer, the second portion of the hard mask residing on the Ta layer.
17. A method for providing a perpendicular magnetic recording (PMR) pole in a magnetic recording transducer comprising:
   providing an etch stop layer;
   providing an intermediate layer on the etch stop layer, the intermediate layer having a top surface;
   providing a Ta layer on the intermediate layer;
   providing a bottom antireflective coating (BARC) on the Ta layer;
   providing a mask on the BARC, the mask including a photoresist line having at least one side;
   transferring the mask to the BARC, a remaining portion of the BARC residing under the line;
   providing a hard mask on the mask, a first portion of the hard mask residing on the at least one side and a second portion of the hard mask residing on the surface of the intermediate layer, the hard mask including a Ru layer and a Cr layer on the Ru layer;
   ion milling at an angle of at least five and not more than fifteen degrees from a normal to the at least one side, at least part of the first portion of the hard mask being removed and at least a portion of the line being exposed;
   removing the line, thereby providing an aperture in the hard mask corresponding to the line;
   forming a trench in the intermediate layer under the aperture, the trench having a bottom and a top wider than the bottom;
   providing a PMR pole, at least a portion of the PMR pole residing in the trench; and
   dry etching a remaining portion of the Ru layer on a yoke portion of the transducer.

* * * * *